3,039,977
METHOD OF PRODUCING SELF-EXTINGUISHING FOAMABLE POLYSTYRENE BY BROMINATING FOAMABLE POLYSTYRENE IN AQUEOUS SUSPENSION
Alvin R. Ingram, Beaver, Pa., assignor to Koppers Company, Inc., a corporation of Delaware
No Drawing. Filed Dec. 3, 1959, Ser. No. 856,895
15 Claims. (Cl. 260—2.5)

This invention generally relates to a method of making self-extinguishing flame-retardant polymeric materials and more particularly to a method for producing low density self-extinguishing flame-retardant vinyl aryl polymers, especially expandable polystyrene and expandable copolymers of styrene.

The use of polymeric foam has been suggested as an insulating material in building construction, but a highly flammable foam would be unsuitable for construction purposes as it would present fire hazards in the buildings and homes.

It is also desirable that polymeric foams which are to be used for making decorative and functional objects for home use should, from the standpoint of safety, be flame-retardant.

"Flame-retardant" means that after a specimen of treated material has been ignited, the rate of burning is slower than the rate of burning of a specimen of untreated material. The flame-retardant characteristic of polymeric foam can be determined by the ASTM Test Method D635-56T. After the flame which causes the burning is removed from a specimen of treated material, this specimen ceases to burn and the characteristic of ceasing to burn is denoted self-extinguishing.

Another highly desirable property of polymeric foam which is to be used as insulating material is that it be of as low a density as possible. Low density is particularly desirable when the foam is to be used as an insulation since the K factor or insulating value of a foam material for practical purposes is inversely proportional to the density.

Self-extinguishing foam has been made heretofore. Copending application Serial No. 778,565, J. J. Tress and W. J. Heilman, describes a method which comprises adding vinyl aryl polymeric particles, e.g. polystyrene particles, to an aqueous suspension containing bromine, heating the suspension and activating the bromine to cause it to combine chemically with the polymer particles, recovering the brominated polymer and then drying it to produce a flame-retardant polymeric material. A volatile aliphatic hydrocarbon including chlorinated hydrocarbons boiling within the range of −10 to 81° C., e.g. isopentane, isohexane, normal-pentane, neopentane, butane and petroleum ether, is incorporated into the polymeric particles before, during or after the bromination step to render the particles expandable. The brominated expandable particles may be partially expanded by heating using hot water, steam, infra-red or radio frequency means to produce a partially expanded product of low density which may be further expanded by heat under confinement, into a flame retardant foam. The flame retardant foam may also be produced directly by expanding by heat, under confinement, the expandable brominated material.

Copending application Serial No. 778,566, A. R. Ingram, now abandoned, describes a novel self-extinguishing vinyl aryl foam product which comprises a vinyl aryl polymeric foam which contains a synergistic combination of flame retardant compounds, i.e., foam from about 0.5–1.75% by weight chemically combined bromine and has integrated therewith from about 0.5–4% by weight of a high boiling phosphorus compound having the formula $$R_1R_2R_3PO_n$$

wherein R is an aliphatic hydrocarbon radical having at least four and not more than 10 carbon atoms, $R_2$ and $R_3$ are radicals selected from the group consisting of alkyl radicals having 4–10 carbon atoms, phenyl, phenyl lower alkyls, lower alkyl phenyl and hydrogen and $n$ is an integer having a value of 3 or 4.

Although the above described foams have excellent fire retardant properties, neither yields a foam of a density of less than about 1.5 lbs. per cubic foot. Obviously, a foam of lower density would be valuable in many applications where insulation value is a prime requisite.

An improved process has now been found for preparing a self-extinguishing vinyl aryl polymer which can be expanded to a bulk density of as low as 0.9 pound per cubic foot. The novel process comprises suspending particles of a vinyl aryl polymer in an aqueous suspension which contains from 5 to 40 parts of a water soluble metal salt of an acid that is at least as strong as carbonic acid. The particles are caused to combine chemically with bromine to render them self-extinguishing and there is incorporated into the particles a blowing agent to render them expandable by heat. In addition to the bromine, other substances which render the material flame retardant may be simultaneously incorporated. The steps of bromination and incorporation of the blowing agent may be performed in any sequence or simultaneously. The suspending of the particles in the salt solution may accompany or follow the bromination and impregnation. Thereafter the brominated polymer is washed and dried to produce the flame-retardant material which may be further expanded by the application of heat.

The aqueous suspension system, in addition to water, contains a water soluble salt of an acid that is at least as strong as carbonic acid, a blowing agent, bromine, a suspending agent, a surface active agent, polymer particles, and may also contain in addition a phosphorus compound of the formula $R_1R_2R_3PO_n$ wherein R is an aliphatic hydrocarbon radical having at least 4 and not more than 10 carbon atoms, $R_2$ and $R_3$ are radicals selected from the group consisting of alkyl radicals of 4–10 carbon atoms, phenyl, phenyl lower alkyls, lower alkyl phenyl and hydrogen and $n$ is an integer having a value of 3 or 4 and ammonia. The various aspects of the components of the suspension are discussed in detail below. The presence of the salt decreases the amount of water which is contained in the resulting particles. The salts useful in the practice of the invention are water-soluble metal salts of acids at least as strong as carbonic acid which are non-reactive with the other components of the suspension system, and which do not interfere with the action of the suspending agent. The cationic constituent of the salt may be chosen from the group consisting of lithium, sodium, potassium, ammonium, rubidium, cesium, magnesium, calcium, barium, copper, nickel, iron, zinc and aluminum. The anionic constituent may be chosen from the group consisting of fluoride, chloride, bromide, iodide, borate, sulfate, sulfite, arsenate, phosphate, nitrate, carbonate, acetate, formate, propionate, cyanide, citrate, glycollate, diglycollate, lactate or oxalate. Particularly useful are sodium chloride, potassium chloride, calcium chloride, and sodium nitrate.

The amount of salt used varies from 5 to 40 parts of salt per hundred parts of polymer. The optimum amount can be readily determined by experimentation. If sodium chloride be used, for example, 10 parts per hundred parts of bead will yield beads with a water content of about 1%. About 26 parts of potassium chloride or 25 parts of calcium chloride are required to yield beads of the same water content.

The blowing agent which is a volatile aliphatic hydrocarbon including chlorinated hydrocarbons boiling within the range of −10 to 81° C. e.g. isopentane, isoheptane, n-pentane, neopentane, butane, 2,4-dimethyl pentane, petroleum ether, is incorporated into the polystyrene particles, before, during or after the bromination step by any conventional means, but preferably according to the method described in the copending application of G. F. D'Alelio, Serial No. 394,230, now U.S. Patent No. 2,983,692. Thereafter the brominated expandable particles may be partially expanded by heating using hot water, steam, infra-red or radio frequency means to produce a partially expanded product of low density capable of further expansion upon heating to form a low density, flame-retardant foam. The flame-retardant foam is also produced directly by expanding the expandable brominated material using the means above described.

Bromine is added to the suspension medium in an amount ranging between 1.5 and 10% based on the weight of the polymer particles used. If less than 1.5% by weight bromine is added to the suspension the resulting product will not be self-extinguishing to the desired degree. The upper limit of bromine concentration is a practical rather than a theoretical one, since it is obviously desirable to operate a process with the minimum consumption of raw material, provided that an acceptable product is obtained. In the preferred embodiment of our invention from 2–4% by weight bromine is added to the suspension. The bromine may be added to the suspension medium either as a liquid or a gas. If the polymer particles are added to the suspension medium prior to the bromine addition it is difficult to achieve intimate and uniform contact between the bromine and polymer, and the resulting product is non-uniform and not wholly flame-retardant unless a surfactant is added to the beads. If it is not added then the bromine must be added to the suspension before the particles are added thereto.

In order to accomplish bromination of the particles the bromine must be made reactive by activating it or by contacting it with the activating agent or a free radical initiator. Ultra-violet light from the commercially available ultra-violet light sources, eg.. a 275-watt General Electric sun lamp, can be used as an activating agent for the bromine, although such techniques are not preferred because of the prolonged reaction time required for bromination. The preferred method of activation is to use a free radical type of initiator in an amount ranging from 0.1–5% by weight based on the weight of the polymer. Free radical initiators suitable for use in the invention include those which decompose rapidly to produce free radicals within the temperature range required for the bromination technique, that is, temperatures between 40–120° C. Free radical initiators of the preferred temperature range for this use include potassium or sodium persulfate, benzoyl peroxide, lauroyl peroxide, peracetic acid, sodium persulfate, periodic acid, lead peroxide, sodium hypochlorite, calcium hypochlorite, and sodium chlorate. The preferred initiator is potassium persulfate. The preferred concentration of these initiators is from about 0.6 to 1.5 moles per mole of bromine charged to the beads.

Although the free radical initiator may be added throughout the course of the reaction it is preferred for purposes of assuring intimate contact between the initiator and the bromine to add the initiator either concurrently with the bromine or at any time before the polymers are charged to the suspension system. To eliminate any corrosion problems which may arise because of the presence of free bromine or free HBr in the final product the free bromine can be neutralized by adding ammonia in an amount such that the pH at the end of the impregnation is approximately 9.5. Alternatively the suspension may be heated under reflux conditions to expel residual bromine and HBr from the polymer particles. The treatment of the brominated beads with ammonia under pressure is particularly advantageous in that the finished product does not attack paper shipping containers and does not corrode aluminum molds.

When using a free radical bromination initiator the temperature for the reaction varies between 40° and 120° C. Below 40° C. there is not sufficient reaction between the bromine and the polymeric particles to result in a final product which is sufficiently flame-retardant. Above 120° C. there is some danger that the particles will agglomerate. Thus, the preferred temperatures are between about 60 and 90° C. At the lower temperatures ranges of the invention, that is, up to about 100° C., bromination is conveniently accomplished at atmospheric pressure, but if the reaction temperature selected is increased, the reaction pressure must correspondingly be increased. Pressures, therefore, of up to about 100 p.s.i.g. at the maximum temperature, are effective.

The preferred polymeric particles, which may be vinyl aryl polymers such as styrene, copolymers of styrene and such monomers as butadiene, alpha methyl styrene, isobutylene and acrylonitrile, used in the present invention are commercially available spherical or irregularly shaped particles ranging in size of for example, through 6 mesh to on 60 mesh (U.S. sieves). Up to 9 to 12 parts by weight of polymer particles are used for each six parts of water in the suspension without running the risk of agglomeration or settling of the particles. It is convenient to use suspensions comprising about equal parts, i.e. a 1:1 weight ratio of polymer and water. The suspension is stabilized by adding thereto 0.1–5% of the dispersing or stabilizing agent based on the total weight of the suspension. Any of the well known organic or inorganic stabilizing agents are suitable for this purpose. Among the organic dispersants alkyl aryl sulfonates are quite suitable. Among inorganic dispersants zinc oxide, calcium carbonate, bentonite, talc, kaolin, calcium phosphate, aluminum oxide, barium sulfate, magnesium carbonate, and the like, are suitable. Particularly effective are the difficultly soluble phosphates described in U.S. Patent 2,594,913 of J. M. Grimm.

If it is desired to incorporate a phosphorus compound of the above described class in order to obtain an improved flame retarder into the polymer particles it is preferably incorporated along with the aliphatic hydrocarbon. This is done since the phosphorus compounds are hydrocarbon soluble and water insoluble. Prior to impregnating the polymeric particles with the volatile hydrocarbon from about 0.5 to 4% by weight of the phosphorus compound is dissolved in the hydrocarbon. This incorporation must be accomplished in the presence of a salt as described above. It is possible to incorporate the phosphorus compound into the final product by either dissolving it in the vinyl aryl monomer or compounding it mechanically with the brominated polymer. Since the aqueous suspension required for the bromination technique is formed in substantially the same manner as is the aqueous medium used for impregnation of the volatile hydrocarbon it is also convenient to brominate and impregnate each simultaneously.

Specific members of that class include 2-ethylhexyldiphenylphosphate, triisooctylphosphite, bis-(2-ethylhexyl) hydrogen phosphate, triisobutylphosphate, phenyl octylene phosphite and the like. Acceptable flame retardance is not obtained using such phosphorus esters as tricresylphosphate, triphenylphosphate, triphenylphosphite, tributoxyethylphosphate, and tris(chloroethyl)phosphite.

The invention is further illustrated by the following examples.

EXAMPLE I

A reactor equipped with an operating agitator was charged consecutively with 100 parts of water, 3.4 parts of potassium persulfate (a bromination initiator), 20 parts of sodium chloride, 3 parts tricalcium phosphate (a suspending agent), 2 parts of bromine and 100 parts of polystyrene beads. The reaction vessel was closed and agitation continued. The suspension was heated for seven hours at 70° C., then heated to reflux, and held for 15 minutes. Thereafter there was added 0.13 parts of sodium nitrite to decompose the bromine fumes in the condenser and vents. Refluxing was continued for 45 minutes and thereafter the suspension was cooled to room temperature, then acidified with dilute hydrochloric acid to a pH of 1. The beads were then separated and dried until they were free flowing. The resulting beads were pearly white and opaque. Total halogen as bromine in the beads was found to be 1.45% when determined by fusing the beads with sodium peroxide-potassium nitrate in a Parr bomb and then titrating with silver nitrate. The soluble halogen as bromine was determined by leaching pulverized beads in an aqueous silver nitrate solution for 24 hours and was found to be 0.40%. The combined bromine was calculated by difference and found to be 1.05%. The water was determined by collecting in a Dean-Starke trap the azeotrope from a toluene solution of beads, and was found to be 2.1%.

A suspension of 100 parts of the above brominated polystyrene beads was impregnated with a blowing agent by suspending 20 parts of sodium chloride, 120 parts of water, 0.011 part of dodecylbenzene sodium sulfonate (a surfactant), 0.044 part of polyvinyl alcohol, 6.6 parts of tricalcium phosphate (suspending agents), sufficient ammonia as a 29% water solution to give a pH of 10.3, 9 parts of isopentane-n-pentane mixture and 1.25 parts of 2-ethylhexyl diphenyl phosphate in a reactor equipped with an agitator. The reactor was closed and heated at 100° C. for 8 hours and thereafter cooled to room temperature, acidified with hydrochloric acid to a pH of 1.0. The beads were recovered, washed with water and dried until they were free flowing.

A foam of these beads was made which had a density of 1 pound per cubic foot. The foam was tested for fire resistance by igniting a vertically mounted strip of 6" x 1.0" x 0.5" dimensions. In this test procedure a foam strip is exposed to a ¾" Bunsen flame and ¼" of the strip is burned and/or melted. The flame is removed and the inches of foam consumed is measured and recorded. A distance of 2.5" or less indicated satisfactory flame retardant properties. In this case the results of five specimens after aging 5 hours at 60° C. in vacuo were 1.75", 2.5", 1.75", 2.0", and 2.5".

As a control, a foam was made without using a salt in the impregnation system in the following manner:

A reactor equipped with an agitator was charged with 100 parts of water, 20 parts of sodium chloride, 3.4 parts of potassium persulfate, (a bromination initiator), 3.0 parts of tricalcium phosphate (a suspending agent), 2 parts of bromine and 100 parts of polystyrene beads. The reaction vessel was closed and agitation started. The suspension was heated for seven hours at 70° C., then heated to reflux and held for fifteen minutes. Thereafter there was added 0.13 part of sodium nitrite which decomposed the bromine fumes in the condenser and vents. Refluxing was continued for 45 minutes and thereafter the suspension was cooled to room temperature and then acidified with dilute hydrochloric acid to a pH of 1. The total halogen as bromine was found to be 1.45% and the soluble halogen as bromine was found to be 0.40%, when determined by the procedures above. The water was also determined by the above procedure and found to be 2.1%.

A suspension of 100 parts of the above brominated polystyrene beads was impregnated with a blowing agent by suspending 120 parts of water, 0.11 part of dodecylbenzene sodium sulfonate (a surfactant), 0.044 part of polyvinyl alcohol, and 6.6 parts of tricalcium phosphate (a suspending agent), sufficient ammonia as a 29% water solution to give a pH of 10.3, 9 parts of an isopentane-n-pentane mixture (the blowing agent) and 1.25 parts of 2-ethylhexyldiphenyl phosphate in a reactor equipped with an agitator. The reactor was closed and heated at 100° C. for 8 hours and thereafter cooled to room temperature, acidified with hydrochloric acid to a pH of 1. The beads were recovered, washed with water, and dried until they were free flowing. The percent water in the impregnated beads was determined by the procedure of Example I, and was found to be 11.2%.

Several unsuccessful attempts were made to produce a foam having a density of 1 pound per cubic foot from these beads. The lowest density produced was 2.4 pounds per cubic foot. The resulting foam exhibited such poor particle-to-particle fusion that it was not tested for fire-retardency.

When a comparison of this control source is made with Example I according to the invention, it can be seen that using the process of the invention as exemplified produces a self-extinguishing foam of a decreased density and a satisfactory foam structure.

EXAMPLE II

A 120 gram portion of these brominated polystyrene particles made according to the procedure of Example I was impregnated in an anhydrous suspension comprising 130 ml. of normal pentane, 2.1 grams of 2-ethylhexyldiphenyl phosphate (1.75% by weight polymer basis), 3.6 grams of calcium carbonate. The particles were held in suspension for 12 hours at 40° C. They were thereafter treated with acid, washed and dried. The impregnated particles were suspended in water at 99° C. for five minutes and then were molded into self-extinguishing foam blocks using conventional steam jets. The density, fusion, and self-extinguishing characteristics were the same as that obtained in Example I wherein the impregnation was conducted in an aqueous suspension.

EXAMPLE III

Bottles of 12 oz. capacity were charged consecutively with 110 milliliters of water, 0.010 gram of Nacconol NRSF, 0.06 gram of polyvinyl alcohol and 6 grams of tricalcium phosphate; 90 grams of polystyrene and 1.8 grams of potassium persulfate were added simultaneously. The bottles were capped and shaken to disperse the contents. Thereafter the caps were removed and 1.8 grams of bromine were added, the bottles recapped and shaken. The bottles were uncapped and a solution of 13 ml. of n-pentane and 0.45 gram of 2-ethylhexyldiphenyl phosphate was added thereto. The bottles were capped and heated for three hours at 90° C. in an oil bath where they were rotated end over end. The bottles were cooled to 50° C. in the oil bath and agitation stopped. By a hypodermic syringe inserted through the stopped there was inserted into the system five milliliters of a 10% aqueous solution of sodium nitrite. The bottles were heated to 90° C. for one hour and thereafter the temperature was reduced to 20° C. The bottles were opened and 13.5 grams of sodium chloride was added along with 0.04 gram of polyvinyl alcohol and sufficient 28% aqueous ammonia solution was added to give a pH of 10.5. The bottles were reheated to 90° C. for two hours. The bottles were cooled to 30° C. and removed from the oil bath. The resulting beads were recovered, washed and dried. The volatile content of the beads was 6.8%; the bulk density of the beads after heating in boiling water for three minutes was 0.87 pound per cubic foot. The beads were molded into a foam of small cell structure having a density of 0.9 pound per cubic foot. When tested for self-extinguishing properties as in Example I the foam gave the following results: 1.75", 2.25", 2.25", and 2.25".

EXAMPLE IV

The process of Example III was repeated except that nine grams of sodium chloride was added in the initial charge. Following the three hour period at 90° C. the bottles were cooled to 30° C. and opened and 2 milliliters of 10% sodium nitrite, 27 milliliters of 0.15% polyvinyl alcohol solution and 10 milliliters of 28% ammonia were added. The bottles were capped and heated for three hours at 90° C. Thereafter the washed, dried beads were partially expanded under infrared and then fully expanded in a confined mold by steam to give a foam having a density of 2 pounds per cubic foot. The foam had self-extinguishing characteristics, when tested by the procedures of Example I, of 1.25", 0.5", 1.75" and 1.25".

EXAMPLE V

Example IV was repeated except that the beads were partially expanded using steam. The molded foam obtained therefrom had a density of 1.0 pound per cubic foot. The self-extinguishing characteristics were, when tested by the procedure of Example I, 1.75", 2.25", 1.5" and 2.25".

EXAMPLE VI

Bottles of 12 oz. capacity were consecutively charged with 90 grams of polystyrene beads, 110 milliliters of water, 12 grams of tricalcium phosphate, 0.015 gram of Nacconol NRSF, 1.125 grams of 2-ethylhexyldiphenyl phosphate and 13 milliliters of n-pentane. The bottles were capped, placed in an oil bath and heated to 90° C. for four hours, during which time they were continuously turned end to end. The bath was then cooled to 20° C. and the bottles opened. To each bottle was added 3.1 grams of potassium persulfate, 18 grams of sodium chloride, and 1.8 grams of bromine. The bottles were capped and placed in the oil bath which was heated for 8 hours at 70° C., during which time the bottles were rotated end to end. Thereafter the bath was cooled to 30° C. The bottles were opened and there was added sufficient aqueous ammonia to give a pH of 10.3 and 0.36 milliliter of an aqueous 10% sodium nitrite solution and 0.04 gram of polyvinyl alcohol. The bottles were capped and heated at 90° C. for one hour, during which time they were rotated end to end. The oil bath was cooled to 30° C., the bottles opened, and the beads separated, washed and dried. The beads were preexpanded with steam to a density of one pound per cubic foot. Foam molded from these beads was non-corrosive and self-extinguishing.

EXAMPLE VII

Example I was repeated using varying amounts of sodium chloride in the impregnation step. The resulting beads contained various amounts of water as indicated in the table below.

Table I

| Type | Parts per Hundred Beads | Moles × 10² | Percent Water in Impregnated Beads |
|---|---|---|---|
| Sodium Chloride | 0.0 | 0 | 11.2 |
| | 5.0 | 8.6 | 4.3 |
| | 10.0 | 17.1 | 1.2 |
| | 15.0 | 25.6 | 0.8 |
| | 20.0 | 34.4 | 0.3 |
| | 25.0 | 42.6 | 0.2 |

EXAMPLE VIII

Example I was repeated using varying amounts of potassium chloride in the impregnation step. The resulting beads contained various amounts of water as indicated in the table below.

Table II

| Type | Parts per Hundred Beads | Moles × 10² | Percent Water in Impregnated Beads |
|---|---|---|---|
| Potassium chloride | 6.4 | 8.6 | 7.2 |
| | 12.7 | 17.1 | 4.8 |
| | 19.1 | 25.6 | 3.8 |
| | 25.6 | 34.4 | 1.2 |
| | 31.8 | 42.6 | 0.8 |

EXAMPLE IX

Example I was repeated using varying amounts of calcium chloride in the impregnation step. The resulting beads contained various amounts of water as indicated in the table below.

Table III

| Type | Parts per Hundred Beads | Moles × 10² | Percent Water in Impregnated Beads |
|---|---|---|---|
| Calcium chloride | 6.4 | 5.8 | 10.6 |
| | 12.6 | 11.4 | 6.4 |
| | 19.0 | 17.1 | 2.0 |
| | 25.4 | 22.9 | 1.4 |
| | 31.6 | 28.4 | 0.4 |

EXAMPLE X

Example I was repeated using varying amounts of sodium sulfate in the impregnation step. The resulting beads contained various amounts of water as indicated in the table below.

Table IV

| Type | Parts per Hundred Beads | Moles × 10² | Percent Water in Impregnated Beads |
|---|---|---|---|
| Sodium sulfate | 8.2 | 5.8 | 8.0 |
| | 16.2 | 11.4 | 4.4 |
| | 24.2 | 17.1 | Beads agglomerated |
| | (and greater) | | |

EXAMPLE XI

Example I was repeated using varying amounts of zinc sulfate in the impregnation step. The resulting beads contained various amounts of water as indicated in the table below.

Table V

| Type | Parts per Hundred Beads | Moles × 10² | Percent Water in Impregnated Beads |
|---|---|---|---|
| Zinc Sulfate | 7.0 | 4.4 | 4.2 |
| | 13.8 | 8.6 | 4.2 |
| | 20.7 | 12.8 | Beads agglomerated |
| | (and greater) | | |

EXAMPLE XII

Example I was repeated using varying amounts of sodium nitrate in the impregnation step. The resulting beads contained various amounts of water as indicated in the table below.

*Table VI*

| Type | Parts per Hundred Beads | Moles × 10² | Percent Water in Impregnated Beads |
|---|---|---|---|
| Sodium Nitrate | 7.3 | 8.6 | 8.0 |
|  | 14.5 | 17.1 | 4.4 |
|  | 21.8 | 25.6 | 3.2 |
|  | 29.2 | 34.4 | 2.8 |
|  | 36.3 | 42.6 | 1.8 |

This invention provides a novel method for making self-extinguishing vinyl aryl polymeric particles. These particles may be expanded to make an integral self-extinguishing foam or they may be partially expanded into free-flowing, low density particles capable of further expansion to form a self-extinguishing foam. Foams made by the method of the present invention have marked utility in the preparation of insulated building panels and decorative articles.

I claim:

1. Method of making self-extinguishing expandable styrene polymers comprising suspending particles of styrene polymers in an aqueous medium containing at least 1.5% by weight bromine based upon the quantity of said particles and 5–40 parts per 100 parts polymer of a water soluble metal salt of an acid at least as strong as carbonic acid, providing said medium with an activating agent for the bromination to the extent of at least 0.5 mole per mole of bromine, maintaining said medium at a temperature of 60–120° C. at least until the color thereof changes from orange to a pale yellow, and including the step of rendering said particles capable of expansion by the integration therewith of a volatile aliphatic hydrocarbon boiling in the range of −10 to 81° C.

2. Method of making self-extinguishing, expandable styrene polymers comprising integrating within particles of styrene polymers a volatile aliphatic hydrocarbon boiling in the range of −10 to 81° C., suspending said particles in aqueous medium containing at least 1.5% by weight bromine based upon the quantity of said particles and, at least 0.5 mole per mole of bromine of a free radical initiator and 5–40 parts per 100 parts polymer of a water soluble metal salt of an acid at least as strong as carbonic acid, heating the reaction medium at a temperature of 60–120° C. at least until the color of said reaction medium changes from orange to a pale yellow, separating said particles from said reaction medium, and drying said particles.

3. Method of making self-extinguishing expandable styrene polymers comprising suspending particles of styrene polymers capable of expansion at a temperature of 60–120° C. in an aqueous medium containing from about 1.5 to 10% by weight bromine based upon the quantity of said particles and 5–40 parts per 100 parts polymer of a water soluble metal salt of an acid at least as strong as carbonic acid, providing said medium with a free radical initiator decomposing at said temperature, said initiator being present in an amount of at least about 0.5 mole per mole of bromine, maintaining said medium at said temperature at least until the color thereof changes from orange to a pale yellow, separating said particles from said medium, washing said particles, and drying said particles, said particles having been rendered capable of expansion by the integration therewith of 4 to 15% of a volatile aliphatic hydrocarbon boiling in the range of −10 to 81° C.

4. Method according to claim 1, wherein said initiator is potassium persulfate.

5. Method according to claim 1, wherein said salt is sodium chloride.

6. Method according to claim 1 wherein said initiator is peracetic acid.

7. Method according to claim 6, wherein the salt is sodium chloride.

8. Method according to claim 1, wherein said particles have a water content of 3% or less.

9. The method of claim 1 wherein the said initiator is potassium persulfate and said salt is sodium chloride.

10. Method according to claim 5 wherein said brominated expandable particles are heated to form a self-extinguishing foam having a density of less than about 2 lbs. per cubic foot.

11. The process of claim 1 wherein the said aqueous suspension system contains sufficient ammonia so that the pH of said aqueous suspension is at least 9.5.

12. The process of claim 2 wherein the said aqueous suspension system contains sufficient ammonia so that the pH of said aqueous suspension is at least 9.5.

13. The process of claim 3 wherein the said aqueous suspension system contains sufficient ammonia so that the pH of said aqueous suspension is at least 9.5.

14. Method of making self extinguishing expandable polystyrene comprising: suspending polystyrene particles capable of expansion in an aqueous medium at a temperature of 60°–120° C. containing from about 1.5%–10% by weight of bromine based upon the quantity of said particles and a water soluble metal salt of an acid at least as strong as carbonic acid, providing said medium with free radical initiator decomposing at said temperature, said initiator being present in an amount of at least about 0.5 mol per mol of bromine, maintaining said medium at said temperature at least until the color thereof changes from orange to pale yellow, separating said particles from said medium, washing said particles and drying said particles, said particles having been rendered capable of expansion by integration therewith of 4%–15% of a volatile aliphatic hydrocarbon boiling in the range of −10° to 81° C.

15. Method of making self extinguishing expandable polystyrene particles of a water content of less than 3% comprising: suspending particles of polystyrene capable of expansion in an aqueous medium at a temperature of 60° to 120° C., said medium containing from about 0.15% to 10% by weight of bromine based upon the quantity of said particles and from 5 to 40 parts per hundred parts of said particles of sodium chloride, providing said medium with potassium persulfate to generate free radicals of bromine, maintaining said medium at said temperature at least until the color thereof changes from orange to pale yellow, separating said particles from said medium, washing said particles and drying said particles, said particles having been rendered capable of expansion by the integration therewith of 5% to 10% of pentane whereby the presence of said sodium chloride, the amount of water in said particles is reduced.

References Cited in the file of this patent

UNITED STATES PATENTS

| | | |
|---|---|---|
| 2,461,302 | Truhlar et al. | Feb. 8, 1949 |
| 2,480,790 | Truhlar et al. | Aug. 30, 1949 |
| 2,503,252 | Ernsberger | Apr. 11, 1950 |
| 2,861,898 | Platzer | Nov. 25, 1958 |
| 2,888,410 | Buchholtz | May 26, 1959 |
| 2,893,963 | Cleland et al. | July 7, 1959 |
| 2,950,261 | Buchholtz | Aug. 23, 1960 |

FOREIGN PATENTS

| | | |
|---|---|---|
| 756,654 | Great Britain | Sept. 6, 1956 |
| 778,761 | Great Britain | July 10, 1957 |